(12) United States Patent
Scott et al.

(10) Patent No.: US 8,919,089 B2
(45) Date of Patent: Dec. 30, 2014

(54) BIASING GUIDE ASSEMBLY FOR HARVESTING AGRICULTURAL ROW CROPS

(71) Applicant: Altria Client Services Inc., Richmond, VA (US)

(72) Inventors: C. Regan Scott, Midlothian, VA (US); Curtis M. Hinton, Glen Allen, VA (US); Tyrone M. Murray, Midlothian, VA (US); Martin Heidorn, Chesterfield, VA (US)

(73) Assignee: Altria Client Services Inc., Richmond, VA (US)

( * ) Notice: Subject to any disclaimer, the term of this patent is extended or adjusted under 35 U.S.C. 154(b) by 0 days.

(21) Appl. No.: 14/166,572

(22) Filed: Jan. 28, 2014

(65) Prior Publication Data

US 2014/0137530 A1 May 22, 2014

Related U.S. Application Data

(63) Continuation of application No. 13/526,141, filed on Jun. 18, 2012, now Pat. No. 8,635,843.

(60) Provisional application No. 61/498,398, filed on Jun. 17, 2011.

(51) Int. Cl.
 *A01D 45/00* (2006.01)

(52) U.S. Cl.
 CPC ..................... *A61D 45/16* (2013.01)
 USPC ............................. 56/327.1; 56/98

(58) Field of Classification Search
 USPC ................... 56/327.1, 13.9, 14.3, 43, 66, 98; 198/819
 See application file for complete search history.

(56) References Cited

U.S. PATENT DOCUMENTS

| | | | |
|---|---|---|---|
| 1,741,602 A * | 12/1929 | Athey | ............ 56/13.9 |
| 2,200,464 A * | 5/1940 | Berry | ................ 56/43 |
| 2,281,904 A * | 5/1942 | Wurtele | ........ 56/13.9 |
| 2,497,845 A | 2/1945 | Burkhart | |
| 3,075,339 A | 1/1963 | Barkstrom | |
| 3,460,326 A | 8/1969 | Holm | |
| 3,492,797 A | 2/1970 | Sears | |

(Continued)

FOREIGN PATENT DOCUMENTS

| | | | | |
|---|---|---|---|---|
| JP | 09308345 A | * | 12/1997 | ............ A01D 25/00 |
| SU | 656581 A | | 4/1979 | |

*Primary Examiner* — Árpád Fábián-Kovács
(74) *Attorney, Agent, or Firm* — Roberts Mlotkowski Safran & Cole, P.C.

(57) ABSTRACT

An apparatus for harvesting agricultural row crops having stalks. The apparatus includes an inclined arm comprising a first section, the first section including: a stalk inlet arranged to receive stalks of row crops; and a cutter arranged to cut stalks received by the stalk inlet; the inclined arm further comprising: a biasing guide assembly disposed along the inclined arm, the biasing guide assembly comprising a plurality of individual biasing members; and a conveyor arranged to engage each received stalk and move each engaged stalk along the biasing guide assembly; the conveyor and the biasing guide assembly mutually arranged such that the biasing guide assembly is operative to apply an accommodating clamping force upon each engaged stalk sufficient to keep each engaged stalk substantially upright as it is conveyed along at least a portion of the arm; the accommodating clamping force accommodating possible differences in stalk diameters from one stalk to another, the plurality of individual biasing members arranged to maintain a substantially constant compressive force on each engaged stalk.

15 Claims, 6 Drawing Sheets

(56) References Cited

U.S. PATENT DOCUMENTS

| | | | |
|---|---|---|---|
| 3,529,714 A * | 9/1970 | Converse et al. ............. 198/819 |
| 3,548,575 A | 12/1970 | Lane |
| 3,587,216 A * | 6/1971 | Donlon et al. ............... 56/327.1 |
| 3,803,820 A | 4/1974 | Knapp |
| 3,871,162 A | 3/1975 | Schexnayder, Jr. et al. |
| 3,930,354 A | 1/1976 | Borderie |
| 3,940,913 A | 3/1976 | Wallenfang et al. |
| 3,988,877 A | 11/1976 | Martin et al. |
| 4,037,392 A | 7/1977 | Taylor et al. |
| 4,048,792 A | 9/1977 | Shriver et al. |
| 4,160,355 A * | 7/1979 | Blake et al. ....................... 56/98 |
| 4,327,542 A | 5/1982 | Van Ginhoven |
| 4,350,207 A | 9/1982 | Ben-Dor |
| 4,444,001 A | 4/1984 | Thurnau et al. |
| 4,566,256 A | 1/1986 | Sousek |
| 4,607,703 A | 8/1986 | Wang |
| 4,813,216 A | 3/1989 | Day, V et al. |
| 5,058,369 A * | 10/1991 | Garner ............................ 56/13.9 |
| 5,185,990 A | 2/1993 | Barnes et al. |
| 5,287,687 A | 2/1994 | Urich et al. |
| 5,428,946 A | 7/1995 | Hansen et al. |
| 5,454,217 A | 10/1995 | Williamson |
| 5,485,716 A | 1/1996 | Baker |
| 5,816,036 A | 10/1998 | Caillouet |
| 5,826,415 A * | 10/1998 | Becker ............................... 56/66 |
| 6,062,009 A | 5/2000 | Caillouet |
| 6,226,968 B1 | 5/2001 | Duncan |
| 7,694,501 B1 | 4/2010 | Hinds et al. |
| 7,980,048 B1 | 7/2011 | Wells et al. |
| 2011/0011048 A1* | 1/2011 | Hoffman ......................... 56/119 |

* cited by examiner

US 8,919,089 B2

BIASING GUIDE ASSEMBLY FOR HARVESTING AGRICULTURAL ROW CROPS

This application is a continuation of U.S. application Ser. No. 13/526,141, filed on Jun. 18, 2012, and claims priority to U.S. Provisional Application No. 61/498,398, filed on Jun. 17, 2011, the contents of each are hereby incorporated by reference in their entirety.

FIELD

The present invention generally relates to an apparatus for the harvesting of agricultural row crops, and more particularly to tobacco harvesters for cutting rows of tobacco and conveying the severed plants.

ENVIRONMENT

Many row crops, such as tobacco, require delicate handling during harvesting to prevent damage to the leaves. As such, manual harvesting of tobacco has been employed for centuries. However, this is not only costly, but time consuming.

Burley tobacco is often harvested by cutting the entire stalk and curing the leaves while attached to the stalk. The cut tobacco plants are often allowed to wilt in the sun for a day or so to reduce the amount of bruising and breaking of the tobacco leaves as the plant is handled. Then, the plants are speared with a stick and hung in a curing or drying barn.

Attempts have been made to develop automated or semi-automated harvesting machinery. An early manually operated tobacco harvesting machine is the subject of U.S. Pat. No. 2,497,845, which utilized a horizontal cutting disc or circular saw mounted for rotation about a vertical axis and driven by one of a pair of wheels which contact the earth. By pushing the machine, the wheel drives the saw such that the teeth on the periphery of the circular saw sever in sequence the stalks of the tobacco plants just above the ground. The stalk is guided to the saw for contact with the teeth periphery through laterally opposed, curved guide blades which define a throat or passage to that cutting member. The guide mechanism effects the subsequent disposition of the severed plants to the side of the tobacco harvesting machine as it passes manually down the row.

Despite advances in the art, there is still a need for a tobacco harvesting machine which is capable of cutting tobacco stalks just above the ground and laying the several stalks in a common direction to facilitate subsequent pick-up with minimal damage to the leaves of the severed stalks.

SUMMARY

Provided herewith is an apparatus for harvesting agricultural row crops having stalks. The apparatus includes a frame having a front portion and a rear portion, the frame configured for traversing along a field of row crops; a hollow arm mounted adjacent an upper section of the front portion of the frame, the hollow arm comprising a first section disposed along an incline formed by the upper section of the front portion of the frame and the ground, the first section having a first end and a second end; a stalk inlet positioned adjacent the first end of the first section of the hollow arm, the stalk inlet for receiving stalks of row crops; means for cutting stalks of row crops, the means for cutting stalks mounted within the first section of the hollow arm; means for engaging and conveying the stalks along the hollow arm; and a biased guide assembly for accommodating stalks of varied diameters, the biased guide assembly comprising a plurality of individual biasing members positioned along at least a portion of the hollow arm to apply an accommodating clamping force to the stalks sufficient to keep each stalk substantially upright as they are conveyed along at least a portion of the hollow arm, the accommodating clamping force accommodating possible differences in stalk diameters from one stalk to another.

In one form, the means for engaging and conveying the stalks along the hollow arm comprises an endless chain having a plurality of links, the plurality of links alternately provided with at least one barb for engaging a stalk.

In another form the plurality of links are alternately provided with three barbs for engaging a stalk.

In yet another form, the endless chain is positioned to travel along at least a portion of a vertical wall of the hollow arm in a spaced relationship with the biased guide assembly.

In a further form, the inlet is provided in front of the means for cutting stalks and configured to direct the row crops into the means for cutting stalks.

In a still further form, the means for cutting stalks includes a circular saw.

In a yet still further form, the circular saw includes a high speed tool steel blade. In another form, the circular saw includes a carbide-tipped blade.

In yet another form, at least a portion of the individual biasing members include a friction-reducing polymeric coating. In still yet another form, the friction-reducing polymeric coating includes ultra high molecular weight polyethylene.

In one form, each of the plurality of individual biasing members is positioned so as to overlap with an adjacent biasing member to maintain a substantially constant compressive force on the stalk.

In another form, the biased guide assembly is effective to accommodate stalks of diameters between about 1.5 to 3.0 inches.

In yet another form, the hollow arm further includes a second section having a first end and a second end, the first end operably connected to the second end of the first section, the second section mounted along the upper section of the front portion of the frame.

In another aspect, provided is a method of harvesting agricultural row crops having stalks is provided. The method includes the steps of sequentially engaging stalks of row crops, cutting each sequentially engaged stalk so as to sever each stalk from the ground, applying a clamping force to each of the engaged stalks sufficient to keep each stalk upright and conveying the stalks to a point for collection. The clamping force is applied by a biased guide assembly for accommodating stalks of varied diameters, the biased guide assembly comprising a plurality of individual biasing members positioned along at least a portion of a hollow arm to apply an accommodating clamping force to the stalks as they are conveyed along at least a portion of the hollow arm, the accommodating clamping force accommodating possible differences in stalk diameters from one stalk to another.

BRIEF DESCRIPTION OF THE DRAWINGS

The forms disclosed herein are illustrated by way of example, and not by way of limitation, in the figures of the accompanying drawings and in which like reference numerals refer to similar elements and in which.

DETAILED DESCRIPTION

Figure 1:
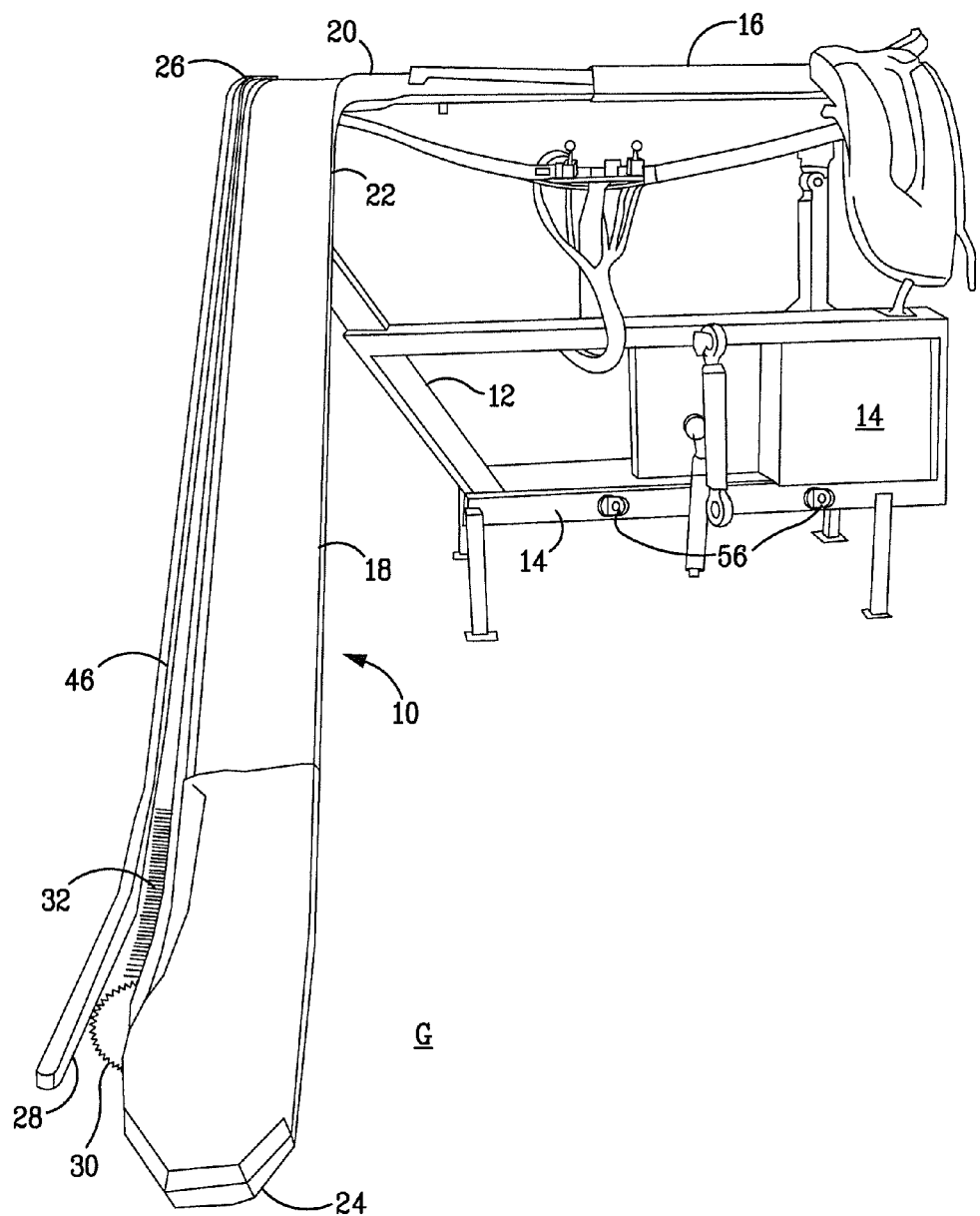
FIG. 1 presents a front plan view of an apparatus for harvesting agricultural row crops having stalks, in accordance herewith.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-8, wherein like numerals are used to designate like elements throughout.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

By "endless chain" is meant a chain whose ends have been united by a link.

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

FIG. 1 presents a front plan view of an apparatus for harvesting agricultural row crops having stalks 10, in accordance herewith. As shown, the apparatus for harvesting agricultural row crops having stalks 10 includes a frame 12 having a front portion 14 and a rear portion 16, the frame 12 configured for traversing along a field of row crops (not shown).

Apparatus 10 also includes a hollow arm 18 mounted adjacent an upper section 20 of the front portion 14 of the frame 12. Hollow arm 18 includes a first section 22 disposed along an incline formed by upper section 20 of front portion 14 of frame 12 and the ground G, first section 22 having a first end 24 and a second end 26. Front portion 14 of frame 12 is provided with tractor mounting points 56 for pulling apparatus through a field during a harvesting operation.

To receive stalks of row crops, hollow arm 18 of apparatus 10 is provided with a stalk inlet 28 positioned adjacent first end 24 of first section 22 of hollow arm 18. To sever the stalks of row crops, hollow arm 18 also includes means for cutting stalks 30. In one form and as shown in FIG. 1, means for cutting stalks 30 may be mounted within first section 22 of hollow arm 18. Once severed, the stalks S are engaged and conveyed along hollow arm 18 using means for engaging and conveying stalks 32.

In one form, means for engaging and conveying 34 may be motor driven so as by a power take-off (PTO) or an electric or gasoline or diesel-fueled motor. The power required by the means for engaging and conveying 34 is on the order of from about one to about five horsepower.

Figure 5:
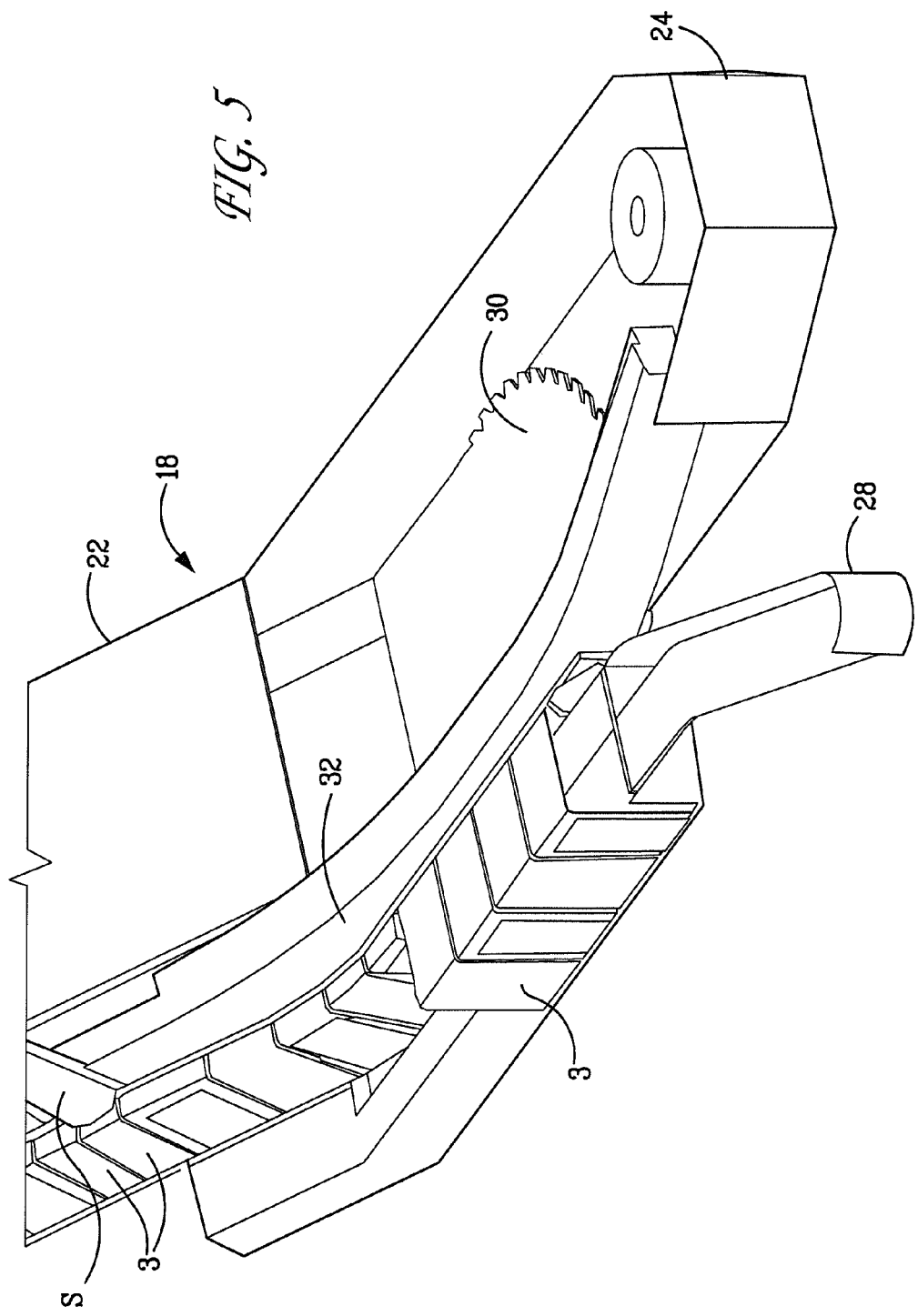
FIG. 5 presents a simplified perspective view of an apparatus for harvesting agricultural row crops having stalks, illustrating a stalk inlet for receiving stalks of row crops, in accordance herewith.
Figure 6:
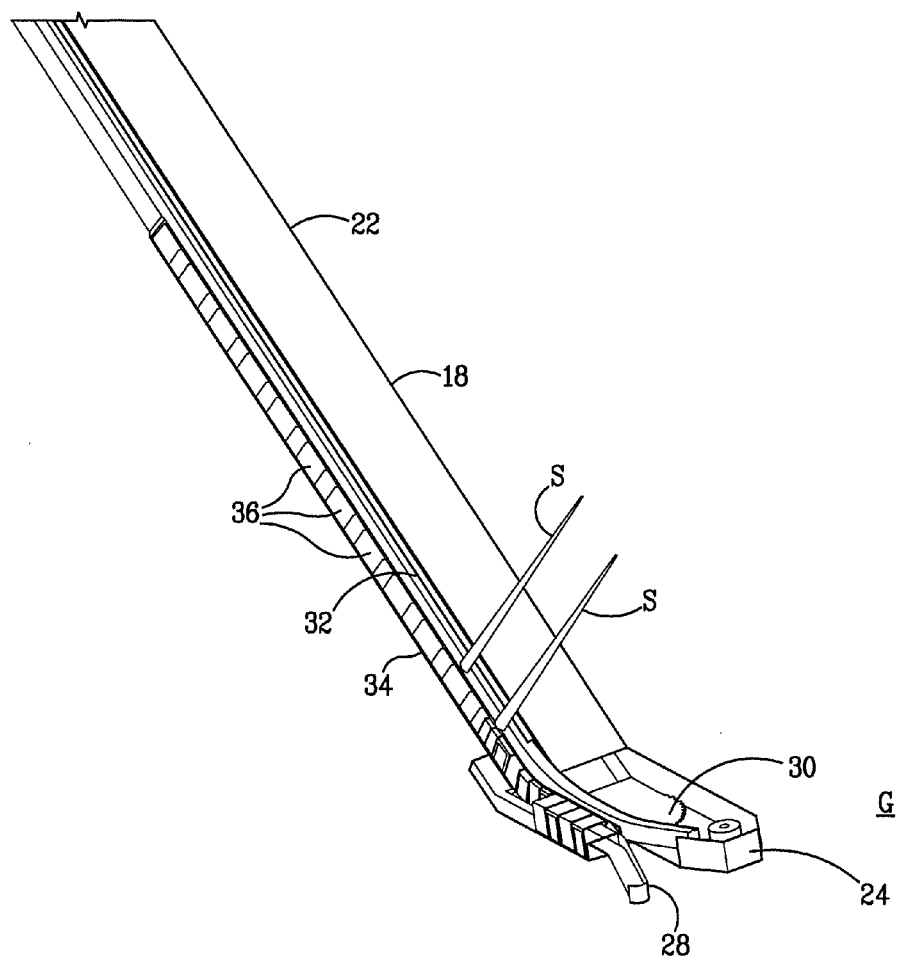
FIG. 6 presents a simplified perspective view of an apparatus for harvesting agricultural row crops having stalks, in accordance herewith.
Figure 7:
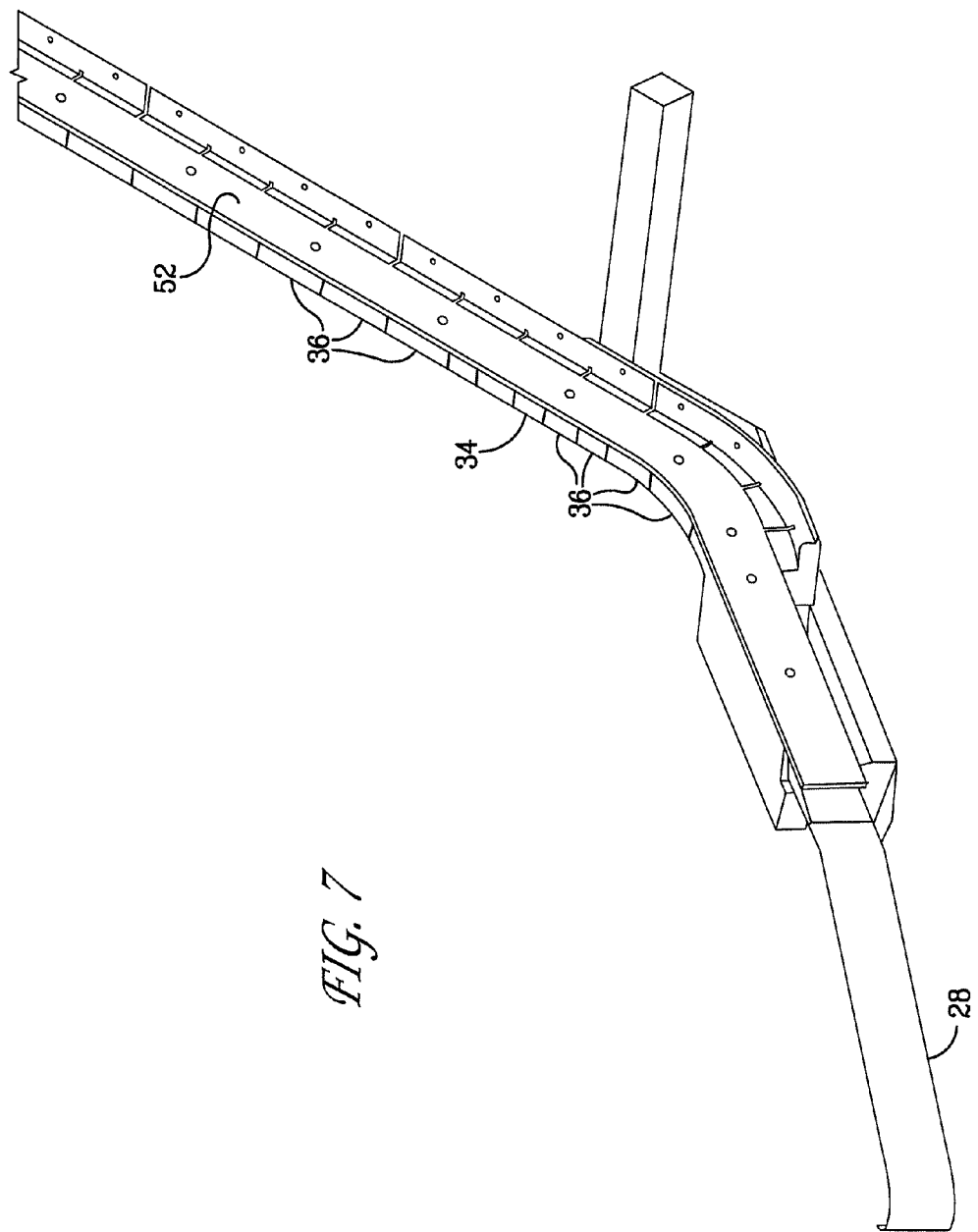
FIG. 7 presents a simplified perspective view of an apparatus for harvesting agricultural row crops having stalks, in accordance herewith.

In one form, to accommodate stalks S of varied diameters, a biased guide assembly 34 is provided. As shown in FIGS. 5-7, biased guide assembly 34 includes a plurality of individual biasing members 36 positioned along at least a portion of hollow arm 18 to a apply clamping force to the stalks S sufficient to keep each stalk S substantially upright as they are conveyed along at least a portion of the hollow arm 18.

Biasing members 36 may be of the J-spring type shown in FIG. 5. The J-spring biasing members 36 are capable of a range of deflection, typically from about 0.1 to about 0.7 inches. Within that range of deflections, a spring force ranging from about 10 to about 30 pounds, or about 15 to about 20 pounds, may be generated. In one form, J-spring biasing members 36 are formed from stainless steel spring stock.

Advantageously, the plurality of J-spring biasing members 36 are preferably sized so as to provide independent biasing action against each stalk as a procession of stalks are moved along the arm 18 via the barbed chain 38. Such arrangement accommodates differences in stalk diameters from one stalk to the next, so that the conveyance of a stalk of large diameter does not compromise retention and conveyance along the arm 18 of a stalk of smaller diameter which might follow or precede the larger one. The operative extent or width of each biasing member is a function of typical spacing between each plant in the field and the typical speeds at which the harvester is moved along a row of plants during harvesting operations. For Burley tobacco, the J-spring biasing members 36 may have a width of several inches, preferably, in the range of approximately 3 to approximately 5 inches, which is measured in the direction of travel of the barbed endless chain up the arm 16.

J-spring biasing members 36 may be selected to be a width that is small enough, so as not to be affected by the in-row spacing of tobacco plants, but wide enough to exert the desired spring force of about 15 to about 20 pounds. In one form, for Burley tobacco, where the smallest typical in-row spacing for tobacco planting is often about 16 inches, it was found that it was desirable to have at least one unused J-spring biasing member 36 separating each stalk S. This equates to four J-spring biasing members 36 per 16 inch segment. In other words, for Burley tobacco, a four inch wide J-spring biasing members 36 may be desirable.

Figure 2:
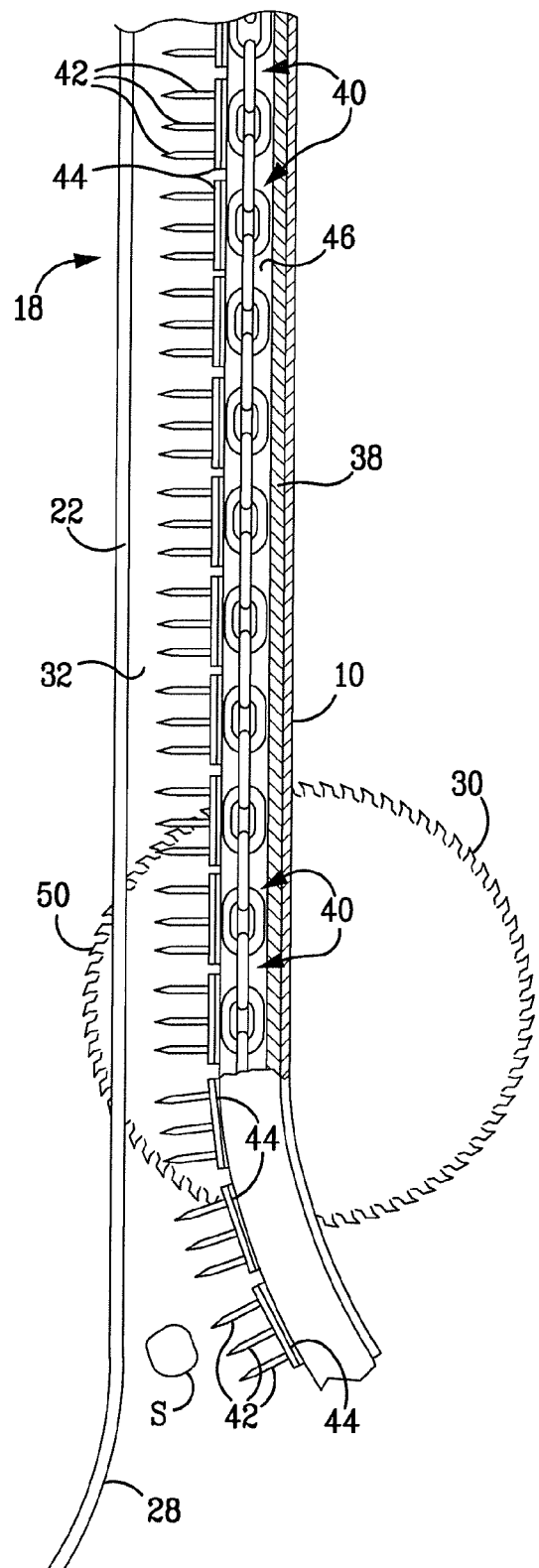
FIG. 2 presents a simplified top plan view of an apparatus for harvesting agricultural row crops having stalks, illustrating the stalk cutter and gripper mechanisms.
Figure 3:
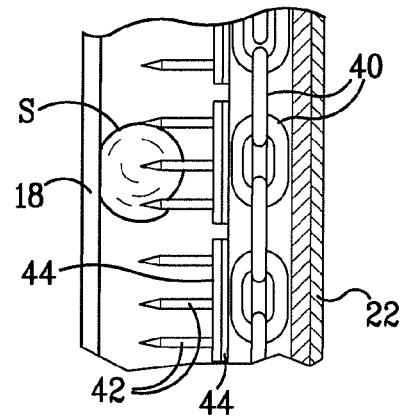
FIG. 3 presents a partial view of FIG. 2 showing a stalk gripped by the gripper mechanism, in accordance herewith.
Figure 4:
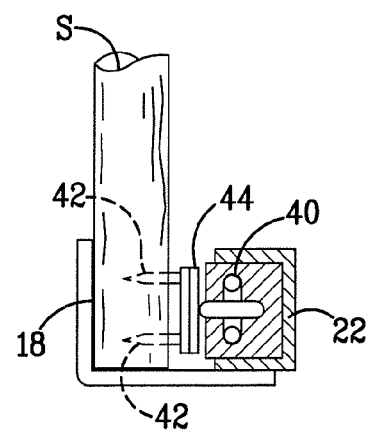
FIG. 4 presents a sectional view of the apparatus for harvesting agricultural row crops having stalks, taken along line 4-4 of FIG. 2, in accordance herewith, in accordance herewith.

Referring in particular to FIGS. 1-4, in one form, means for engaging and conveying stalks 32 along hollow arm 18 includes an endless chain 38 having a plurality of links 40, the plurality of links 40 alternately provided with at least one barb 42 for engaging a stalk S. As shown in FIGS. 2-4, in one form, the plurality of links 40 are alternately provided with at least three barbs 42, each mounted to a platform 44 for engaging a stalk S. As shown, endless chain 38 may be positioned to travel along at least a portion of a vertical wall 46 of hollow arm 18 in a spaced relationship with biased guide assembly 34.

Referring now to FIGS. 5 and 6, in one form, inlet 28 is provided in front of means for cutting stalks 30 and configured to direct the row crops into means for cutting stalks for severing from the roots of the row crops. While a variety of means for cutting stalks 30 are contemplated as having utility herein, in one form, means for cutting stalks includes a circular saw 50 mounted to hollow arm 18.

In one form, circular saw 50 includes a high speed tool steel blade. In another form contemplated herein, circular saw 50 includes a carbide-tipped blade. As may be appreciated by those skilled in the art, such circular saw blades are available commercially from a variety of sources.

Referring now to FIG. 7, in one form, to aid in the smooth conveying of stalks S of varied diameters, at least a portion of the plurality of individual biasing members 36 of biased guide assembly 34 are provided with a friction-reducing polymeric coating 52. In one form, the friction-reducing polymeric coating 52 includes ultra high molecular weight polyethylene (UHMWPE). In one form, polymeric coating 52 may comprise an elongated strip of UHMWPE. The UHMWPE strip 52 can be of thickness of from about 1/16 to about 1/4 inch. In one form the UHMWPE strip 52 is about 1/8 inch in thickness.

In one form, each of the plurality of individual biasing members 36 are positioned so as to overlap with an adjacent biasing member 36 to maintain a substantially constant compressive force on the stalk.

In one form, biased guide assembly 34 is effective to accommodate stalks of diameters between about 1.5 to 3.0 inches.

Referring now to FIG. 1, hollow arm 18 of apparatus 10 further includes a second section having a first end and a second end, the first end operably connected to the second end of the first section, the second section mounted along the upper section of the front portion of the frame.

Figure 8:
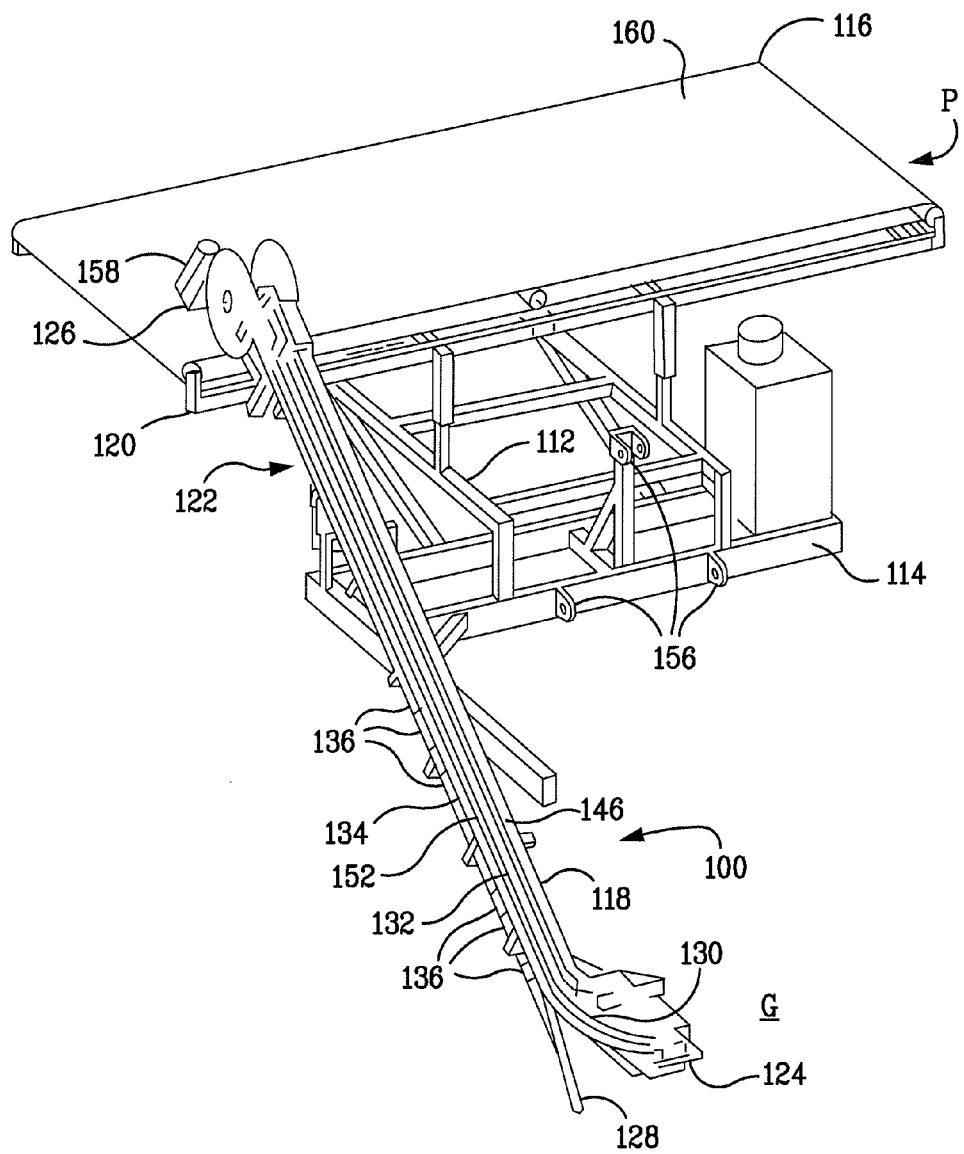
FIG. 8 presents a perspective view of another form of an apparatus for harvesting agricultural row crops having stalks, in accordance herewith.

Referring now to FIG. 8, another form of an apparatus for harvesting agricultural row crops having stalks 100 is shown. As shown, the apparatus for harvesting agricultural row crops having stalks 100 includes a frame 112 having a front portion 114 and a rear portion 116, the frame 112 configured for traversing along a field of row crops (not shown). Front portion 14 of frame 12 is provided with tractor mounting points 56 for pulling apparatus through a field during a harvesting operation.

Apparatus 100 also includes a hollow arm 118 mounted adjacent an upper section 120 of the front portion 114 of the frame 112. Hollow arm 118 includes a first section 122 disposed along an incline formed by upper section 120 of front portion 114 of frame 112 and the ground G, first section 122 having a first end 124 and a second end 126.

To receive stalks of row crops, hollow arm 118 of apparatus 100 is provided with a stalk inlet 128 positioned adjacent first end 124 of first section 122 of hollow arm 118. To sever the stalks of row crops, hollow arm 118 also includes means for cutting stalks 130. In one form and as shown in FIG. 8, means for cutting stalks 130 may be mounted within first section 122 of hollow arm 118. Once severed, the stalks are engaged and conveyed along hollow arm 118 using means for engaging and conveying stalks 132.

As indicated above, means for engaging and conveying 134 may be motor driven so as by a power take-off (PTO) or an electric or gasoline or diesel-fueled motor. The power required by the means for engaging and conveying 134 is on the order of from about one to about five horsepower.

In one form, second end 126 includes a ballast 158 so that hollow arm 118 can easily rise or drop according to the irregularities of the ground G. Hollow arm 118 may advantageously be mounted so as to be able to swivel around both vertical axis and a horizontal axis.

In one form, to accommodate stalks of varied diameters, a biased guide assembly 134 is provided. Biased guide assembly 134 includes a plurality of individual biasing members 136 positioned along at least a portion of hollow arm 118 to a apply clamping force to the stalks S sufficient to keep each stalk substantially upright as they are conveyed along at least a portion of the hollow arm 118.

Biasing members 136 may be of the J-spring type shown in FIG. 5. The J-spring biasing members 136 are capable of a range of deflection, typically from about 0.1 to about 0.7 inches. Within that range of deflections, a spring ranging from about 10 to about 30 pounds may be generated. In one form, J-spring biasing members 136 are formed from stainless steel spring stock.

Still referring to FIG. 8, as with the form depicted by FIGS. 1-4, means for engaging and conveying stalks 132 along hollow arm 118 includes an endless chain (not shown) having a plurality of links, the plurality of links alternately provided with at least one barb (not shown) for engaging a stalk.

Consistent with the form shown in FIGS. 2-4, the plurality of links are alternately provided with at least three barbs, each mounted to a platform for engaging a stalk. An endless chain may be positioned to travel along at least a portion of a vertical wall 146 of hollow arm 118 in a spaced relationship with biased guide assembly 134.

Referring again to FIG. 8, in one form, inlet 128 is provided in front of means for cutting stalks 130 and configured to direct the row crops into means for cutting stalks 130 for severing from the roots of the row crops. While a variety of means for cutting stalks 130 are contemplated as having utility herein, in one form, means for cutting stalks includes a circular saw (not shown) mounted to hollow arm 118.

As indicated above, the circular saw may include a high speed tool steel blade. In another form, the circular saw may include a carbide-tipped blade. As indicated, such circular saw blades are available commercially from a variety of sources.

As with the form depicted in FIG. 7, to aid in the smooth conveying of stalks of varied diameters, at least a portion of the plurality of individual biasing members 136 of biased guide assembly 134 are provided with a friction-reducing polymeric coating. In one form, the friction-reducing polymeric coating 152 includes ultra high molecular weight polyethylene (UHMWPE). In one form, polymeric coating 152 may comprise an elongated strip of UHMWPE. The UHMWPE strip 152 can be of thickness of from about 1/16 to about 1/4 inch. In one form the UHMWPE strip 152 is about 1/8 inch in thickness.

In one form, each of the plurality of individual biasing members 136 are positioned so as to overlap with an adjacent biasing member 136 to maintain a substantially constant compressive force on the stalk.

In one form, biased guide assembly 134 is effective to accommodate stalks of diameters between about 1.5 to 3.0 inches.

Optionally, apparatus 100 may include a conveyer 160 for depositing cut row crops thereupon. Conveyer 160 is operably connected to frame 112 for receiving stalks and transferring them to a processing point P. As shown, conveyor 160 runs along substantially the entire length of frame 112.

Another saw or notching means (not shown) may be provided at or near second end 126 of hollow arm 118. The notching means is provided to enable the notching of the stalk near its severed end to permit the hanging of the stalk for drying or curing, as is typically done with Burley tobacco.

In another form, a method of harvesting agricultural row crops having stalks is provided. The method includes the steps of sequentially engaging stalks of row crops, cutting each sequentially engaged stalk so as to sever each stalk from the ground, applying a clamping force to each of the engaged stalks sufficient to keep each stalk upright and conveying the stalks to a point for collection. The clamping force is applied by a biased guide assembly for accommodating stalks of varied diameters, the biased guide assembly comprising a plurality of individual biasing members positioned along at least a portion of a hollow arm to apply clamping force to the stalks as they are conveyed along at least a portion of the hollow arm.

While the present inventions have been described in connection with a number of exemplary forms, and implementations, the present inventions are not so limited, but rather cover various modifications, and equivalent arrangements, which fall within the purview of the present claims.

What is claimed:

1. An apparatus for harvesting agricultural row crops having stalks, comprising:
   an inclined arm comprising a first section having first and second ends, said first section including: a stalk inlet arranged to receive stalks of row crops; and a cutter arranged to cut stalks received by said stalk inlet;
   said inclined arm further comprising: a biasing guide assembly disposed along said inclined arm, said biasing guide assembly comprising a plurality of individual sprung biasing members; and a single conveyor chain arranged to engage each received stalk and move each engaged stalk along said biasing guide assembly;
   said single conveyor chain and said biasing guide assembly mutually arranged such that said biasing guide assembly is operative to apply an accommodating clamping force upon each engaged stalk sufficient to keep each engaged stalk substantially upright as it is conveyed along at least a portion of said arm;
   said accommodating clamping force accommodating possible differences in stalk diameters from one stalk to another, said plurality of individual biasing members arranged to maintain a substantially constant compressive force on each engaged stalk.

2. The apparatus of claim 1, wherein said single conveyor chain comprises an endless chain having a plurality of links, said plurality of links alternately provided with at least one barb for engaging a stalk.

3. The apparatus of claim 2, wherein said plurality of links are alternately provided with three barbs for engaging a stalk.

4. The apparatus of claim 2, wherein said endless chain is positioned to travel along at least a portion of a vertical wall of said inclined arm in a spaced relationship with said biased guide assembly.

5. The apparatus of claim 1, wherein said cutter comprises a circular saw.

6. The apparatus of claim 5, wherein said circular saw comprises a high speed tool steel blade.

7. The apparatus of claim 5, wherein said circular saw comprises a carbide-tipped blade.

8. The apparatus of claim 1, wherein at least a portion of said plurality of individual biasing members include a friction-reducing polymeric coating.

9. The apparatus of claim 8, wherein said friction-reducing polymeric coating comprises ultra high molecular weight polyethylene.

10. The apparatus of claim 1, wherein each of said plurality of individual biasing members are positioned so as to at least partially overlap with an adjacent biasing member to maintain the substantially constant compressive force upon each engaged stalk.

11. The apparatus of claim 1, wherein said biased guide assembly is effective to accommodate stalks of diameters between about 1.5 to 3.0 inches.

12. The apparatus of claim 1, wherein said inclined arm further comprises a second section having a first end and a second end, said first end operably connected to said second end of said first section, said second section mounted along an upper section of a frame.

13. The apparatus of claim 12, further comprising another conveyor mounted along said upper section of the frame for depositing cut row crops thereupon.

14. The apparatus of claim 13, wherein said second conveyor is operably connected to said frame and structured and arranged to transfer cut row crops to a processing point.

15. The apparatus of claim 1, wherein the individual sprung biasing members are J springs.

* * * * *